US 12,488,346 B2

United States Patent
Peterman

(10) Patent No.: US 12,488,346 B2
(45) Date of Patent: Dec. 2, 2025

(54) AUTOMATIC BULK TOKEN MIGRATION USING REDUCED MEMORY RESOURCES

(71) Applicant: Truist Bank, Charlotte, NC (US)

(72) Inventor: Luana Peterman, Lancaster, SC (US)

(73) Assignee: Truist Bank, Charlotte, NC (US)

( * ) Notice: Subject to any disclaimer, the term of this patent is extended or adjusted under 35 U.S.C. 154(b) by 160 days.

(21) Appl. No.: 18/122,796

(22) Filed: Mar. 17, 2023

(65) Prior Publication Data

US 2024/0311830 A1   Sep. 19, 2024

(51) Int. Cl.
*G06Q 20/40* (2012.01)
*G06Q 20/10* (2012.01)
*H04L 9/32* (2006.01)

(52) U.S. Cl.
CPC ....... *G06Q 20/4014* (2013.01); *G06Q 20/102* (2013.01); *H04L 9/3213* (2013.01)

(58) Field of Classification Search
None
See application file for complete search history.

(56) References Cited

U.S. PATENT DOCUMENTS

| 11,935,020 | B1 * | 3/2024 | Fakhraie | G06F 16/215 |
| 2014/0344153 | A1 * | 11/2014 | Raj | G06Q 20/385 |
| | | | | 705/44 |
| 2020/0051069 | A1 * | 2/2020 | Wilson | G06F 16/1834 |
| 2022/0385662 | A1 * | 12/2022 | Wells | H04L 63/10 |
| 2023/0131348 | A1 * | 4/2023 | Landerholm | H04L 9/0877 |
| | | | | 713/168 |
| 2024/0127230 | A1 * | 4/2024 | Hecht | G06Q 20/38215 |

FOREIGN PATENT DOCUMENTS

WO   WO-2021222780 A1 *  11/2021   ......... H04L 63/0876

OTHER PUBLICATIONS

Zhang, Y., et al., "TrustTokenF: a Generic Security Framework for Mobile Two-factor Authentication Using TrustZone", 2015 IEEE Trustcom/BigDataSE/ISPA. (Year: 2015).*

* cited by examiner

*Primary Examiner* — Clay C Lee
(74) *Attorney, Agent, or Firm* — Kilpatrick Townsend & Stockton LLP; Michael A. Springs, Esq.

(57) ABSTRACT

A system that can, using reduced memory and processor resources, receive a list including active and inactive user tokens associated with a first entity, cause a central token database server to disassociate the stored user tokens associated with the first entity, subsequently receive a bulk file containing a listing of disassociated user tokens from the central token database server, compare the listing of disassociated user tokens identified in the bulk file with the list of user tokens, and in response, extract the active user tokens in the bulk file. The system can additionally cause the central token database server to associate the active user tokens with a second entity, receive confirmation of association from the central token database server, and output a command to activate at the second entity, user accounts that will use the extracted active user tokens for identity verification during processing of user electronic transactions.

18 Claims, 3 Drawing Sheets

AUTOMATIC BULK TOKEN MIGRATION USING REDUCED MEMORY RESOURCES

TECHNICAL FIELD

The present disclosure relates generally to data memory and processor resource management, and more particularly, although not exclusively, to automatically performing a bulk migration of user identification tokens using reduced memory and processor resources.

BACKGROUND

Electronic transaction management can involve the processing of significant amounts of information, at least some of which may relate to transaction security. For example, it is common practice to verify the legitimacy of a given electronic transaction and the identification of one or more users related to a given electronic transaction.

Electronic transaction security protocols, such as user identification, may also require the storage of a substantial amount of data. As one example, electronic transaction systems that facilitate online payments between parties (e.g., individuals and businesses) typically make use of a security token to verify the identity of each party to an online payment. Each user identification token is stored, such as at a central database or server, and associated with one or more transaction processing entities to permit accessing and use of the tokens during directing of associated electronic transactions. A given user may have multiple identification tokens, and many thousands of users may be associated with a single transaction processing entity. Thus, the overall volume of information to be stored and processed may be substantial, and can resultantly require a significant amount of both memory and processor resources.

Because electronic transaction systems that facilitate online payments between parties utilize tokens that are associated not only with the parties (users) but also with individual transaction processing entities, required migration of user tokens as a result of a sale, merger or another change to a given transaction processing entity is commonly tedious, slow, and can consume significant memory and processor resources. For example, a typical process of migrating user tokens from a prior transaction processing entity to a succeeding transaction processing entity, can involve an exchange of electronic messages between the succeeding transaction processing entity and the custodian of a central repository of user tokens, relative to each and every user token to be migrated. Token migration itself may also occur on a token-by-token basis, which is not only extremely time-consuming but requires significant memory and processor resources to handle the potentially many thousands of related electronic messages and the repeated sorting through and transferring of an even greater number of user tokens.

SUMMARY

According to one example of the present disclosure, a system may include a database, a processor communicatively coupled to the database, and memory that is communicatively coupled to the processor and includes instructions that are executable by the processor to cause the processor to perform operations. The operations may include receiving from the database, a list of user tokens associated with a first entity, the user tokens including active user tokens and inactive user tokens, and outputting a command to a central token database server to cause the central token database server to disassociate, from the first entity, the user tokens that are associated with the first entity and stored at the central token database server. The operations may also include, subsequently receiving from the central token database server, a bulk file containing a listing of disassociated user tokens, where the disassociated user tokens comprise user tokens disassociated from the first entity by the central token database server in response to the command from the processor, and comparing a listing of the disassociated user tokens identified in the bulk file with the list of user tokens. The operations may additionally include, in response to comparing the listing of disassociated user tokens with the list of user tokens, extracting the user tokens in the bulk file that are active user tokens. The operations may further include, outputting a command to the central token database server to cause the central token database server to associate the active user tokens with a second entity, and storing the active user tokens at the central token database server. The operations may still further include receiving from the central token database server, confirmation that the active user tokens are associated with the second entity, and in response to receiving the confirmation from the central token database server, outputting a command to activate, at the second entity, user accounts that use the active user tokens for identity verification during processing of user electronic transactions by the second entity.

According to another example of the present disclosure, a non-transitory computer readable medium may contain instructions that are executable by a processor to cause the processor to perform operations. The operations may include receiving from the database, a list of user tokens associated with a first entity, the user tokens including active user tokens and inactive user tokens, and outputting a command to a central token database server to cause the central token database server to disassociate, from the first entity, the user tokens that are associated with the first entity and stored at the central token database server. The operations may also include, subsequently receiving from the central token database server, a bulk file containing a listing of disassociated user tokens, where the disassociated user tokens comprise user tokens disassociated from the first entity by the central token database server in response to the command from the processor, and comparing a listing of the disassociated user tokens identified in the bulk file with the list of user tokens. The operations may additionally include, in response to comparing the listing of disassociated user tokens with the list of user tokens, extracting the user tokens in the bulk file that are active user tokens. The operations may further include, outputting a command to the central token database server to cause the central token database server to associate the active user tokens with a second entity, and storing the active user tokens at the central token database server. The operations may still further include receiving from the central token database server, confirmation that the active user tokens are associated with the second entity, and in response to receiving the confirmation from the central token database server, outputting a command to activate, at the second entity, user accounts that use the active user tokens for identity verification during processing of user electronic transactions by the second entity.

According to a further example of the present disclosure, a computer-implemented method may include receiving at a processor, from a database, a list of user tokens associated with a first entity, the user tokens including active user tokens and inactive user tokens, and outputting by the processor, a command to a central token database server to cause the central token database server to disassociate from the first entity, the user tokens that are associated with the first entity and stored at the central token database server. The method may also include receiving, by the processor from the central token database server, a bulk file containing a listing of disassociated user tokens, where the disassociated user token comprise user tokens disassociated from the first entity by the central token database server in response to the command from the processor, and comparing by the processor, the listing of disassociated user tokens identified in the bulk file with the list of user tokens. The method may additionally include, in response to comparing the listing of disassociated user tokens with the list of user tokens, extracting by the processor, the user tokens in the bulk file that are active user tokens. The method may further include outputting, by the processor, a command to the central token database server to cause the central token database server to associate the active user tokens with a second entity, and storing the active user tokens at the central token database server. The method may still further include receiving, by the processor from the central token database server, confirmation that the active user tokens are associated with the second entity, and in response to receiving the confirmation, activating by the processor, at the second entity, user accounts that use the extracted active user tokens for identity verification during processing of user electronic transactions by the second entity.

DETAILED DESCRIPTION

Certain aspects and examples of the present disclosure generally relate to a processor-based system for automatically effecting the migration of user identification tokens from one transaction processing entity to another. Examples according to the present disclosure overcome inefficiency and resource-consumption problems associated with the typical process of migrating user tokens via electronic message exchange on a token-by-token basis, by instead causing user tokens to be efficiently disassociated from a first entity and migrated to a second entity in bulk.

A system according to the present disclosure may transmit user token disassociation and user token association commands to a user token repository such as, for example, a central token database server, to cause user tokens to be disassociated in bulk from a first entity and subsequently migrated to and associated in bulk with a second entity. Upon confirmation of token association with the second entity, a system according to the present disclosure may also cause the activation of user accounts at the second entity that will use the migrated user tokens for purposes of user identity verification during processing of related electronic transactions by the second entity.

Instructing a user token repository to disassociate user tokens in bulk from a first entity and to subsequently associate user tokens in bulk with a second entity can save memory and processor resources that may be utilized for other tasks or, alternatively, may allow for use of a less costly system. Furthermore, omitting inactive user tokens from, or otherwise extracting and including only active user tokens in the commands that cause association of previously disassociated user tokens with a second entity, allows additional memory and processor resources to be conserved because the system does not need to compare or otherwise operate on superfluous data.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

Figure 1:
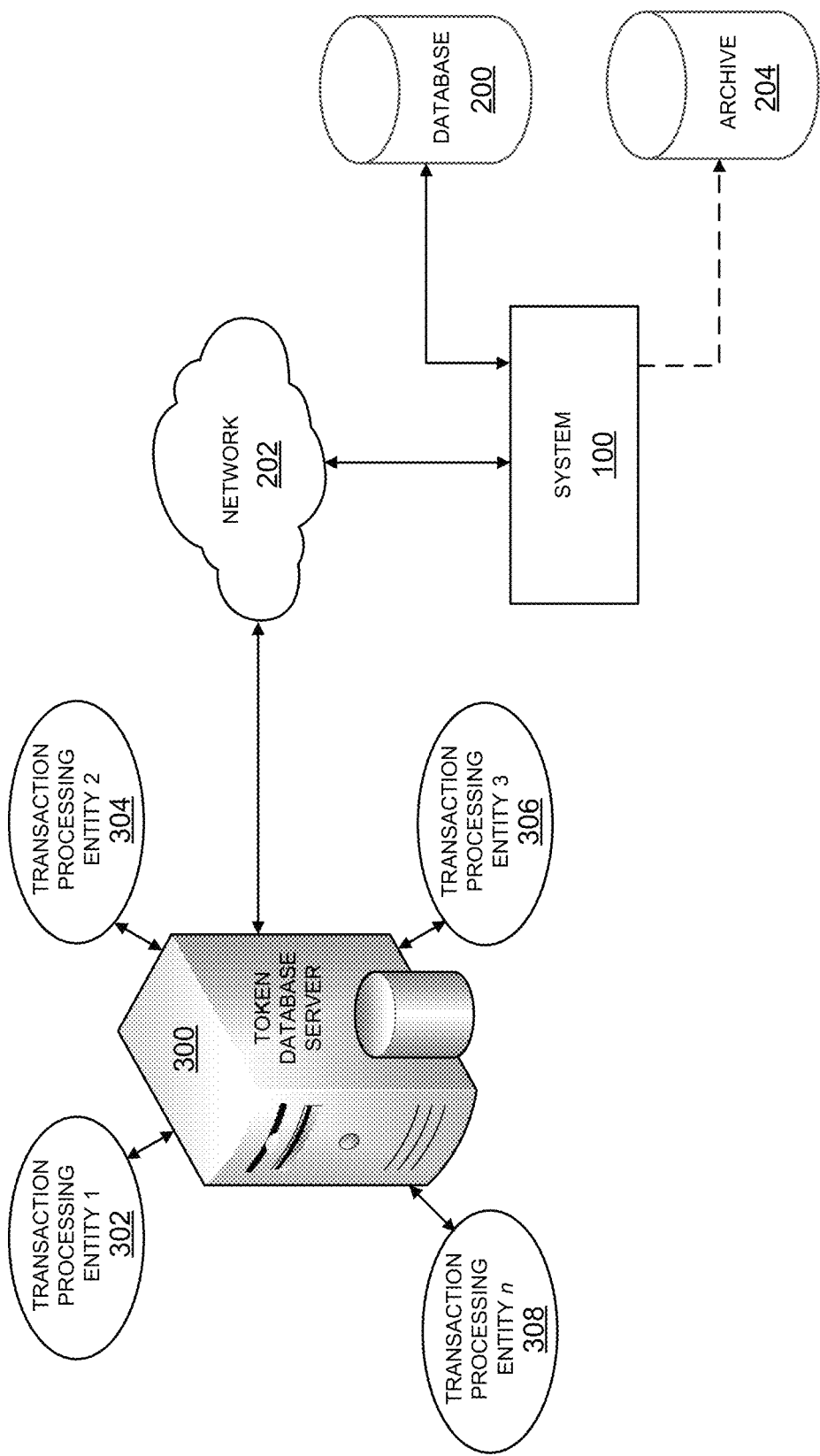
FIG. 1 is a schematic diagram of a system for automatically migrating user identification tokens in bulk from one transaction processing entity to another using reduced memory resources, according to an example of the present disclosure.

FIG. 1 is a schematic diagram of a system 100 for migrating user identification tokens (also referred to herein as "user tokens") from one transaction processing entity to another using reduced memory and processor resources, wherein the user token migration process involves among other things, causing at a central token repository, the disassociation of user tokens associated with a first entity and the subsequent association of active ones of the disassociated user tokens with a second entity. The user token migration process may be performed in bulk, meaning that the system may cause the disassociation of a multitude of user tokens from a first entity in one operation, and subsequently may cause the association of a multitude of user tokens with a second entity in another operation, instead of performing the user token disassociation and association operations on a token-by-token basis.

In the system 100 example of FIG. 1, the user tokens operated on by the system may be tokens used to identify the parties to an online payment transaction, such as an online payment by a first party to a second party, or vice versa. The parties may each be, for example, individual users, businesses, or some combination thereof. At least the user token(s) associated with the paying party may be associated with a particular transaction processing entity (e.g., financial institution) from which the paying party seeks to transfer funds to the receiving party. One commercial example of such a system for processing peer-to-peer payment transactions is the Zelle Network® operated by Early Warning Service, LLC. While the system 100 of FIG. 1 is described herein for purposes of illustration with respect to its application to online payment transactions, other system examples according to the present disclosure may be directed to efficiently migrating other types of tokens or security credentials.

As represented in FIG. 1, the system 100 is in communication with a database 200, which may be in communication with a user token repository such as, for example, a central token database server 300. Communication between the system 100 and the database, and the system 100 and the central token database server 300, may occur via a network 202. Depending at least in part on the location of the system 100, the network 202 may be without limitation, a local area network (LAN), a wide-area network (WAN) such as the Internet, an institutional network, cellular or other wireless networks, virtual networks such as an intranet or an extranet, etc.

The central token database server 300 may be in communication with various transaction processing entities, depicted in FIG. 1 as a first transaction processing entity 302, a second transaction processing entity 304, a third transaction processing entity 306, and a nth transaction processing entity 308. There is no finite limit on the number of transaction processing entities with which the central token database server 300 may be in communication, and for which the central database server may store associated user tokens. When a transaction processing entity 302-308 receives a request from a paying party with an account at the transaction processing entity to process an online payment (e.g., from the paying party's bank account) to a designated receiving party, a user token(s) associated with the paying party and the transaction processing entity is utilized to verify the transaction.

According to an aspect of the present disclosure, a central token repository such as the central token database server 300 may be in communication with thousands of individual transaction processing entities, and each of the transaction processing entities may have thousands, if not hundreds of thousands, of individual users that make online payments requiring token-based verification. Consequently, there may be a large number of user tokens stored at the central token database server 300, and migrating user tokens from one associated transaction processing entity to another on a token-by-token basis would be tedious, and consume significant memory and processor resources.

The system 100 of FIG. 1 overcomes such problems. In operation, the system 100 receives from the database 200, a list including both active user tokens and inactive user tokens that are associated with a first entity (e.g., a first transaction processing entity). The first entity may, for example, be the subject of a merger, a sale, or may otherwise be undergoing a change that results in a required disassociation of the user tokens currently associated with the first entity. For example, the first entity may not go forward doing business under its current name.

In any case, due to the required disassociation of user tokens, the system 100 may output a command to the central token database server 300 to cause the central token database server to disassociate from the first entity, the user tokens that are associated with the first entity and stored at the central token database server. In response, the central token database server 300 will carry out the user token disassociation directions sent by the system 100, and the system 100 may subsequently receive from the central token database server 300, a bulk file containing a listing of disassociated user tokens, where the disassociated user tokens in the bulk file comprise user tokens that were stored in the central token database server 300 relative to the first entity and were disassociated from the first entity by the central token database server in response to the command received from the system 100.

Once the bulk file has been received from the central token database server 300, the system 100 may generate a notification that the user tokens previously associated with the first entity are disassociated from the first entity in accordance with the user token disassociation command sent to the central token database server 300 by the system 100. The notification may be transmitted by the system 100 to the first entity at any time after generation, including not until migration of the user tokens to the second entity is complete.

Subsequent to receipt of the bulk file from the central token database server 300, the system 100 may compare the listing of disassociated user tokens identified in the bulk file with the list of user tokens previously received from the database, and may extract from the bulk file the user tokens that are active user tokens. The system 100 may store in the database 200, a list of the active user tokens that are extracted from the bulk file. The system 100 may then transmit a command to the central token database server 300 to cause the central token database server to associate the active user tokens with a second entity and to store the active user tokens at the central token database server. Eliminating inactive user tokens and limiting the central token database server 300 to associating only active user tokens with the second entity can save significant memory and processor resources, especially when the large number of possible user tokens to be processed is considered.

The system 100 may also receive confirmation from the central token database server 300 that the extracted active user tokens are associated with the second entity. With the extracted active user tokens associated with the second entity, the system 100 may proceed to output a command to activate user accounts at the second entity that use the active user tokens for identity verification, so that users can make online peer-to-peer or other payments through the second entity.

As also indicated in FIG. 1, the system 100 may be in communication with a user token archive 204, such as an archival database. The user token archive 204 may be used to store various user token information, such as but not limited to, a listing of the inactive user tokens appearing in the list of user tokens received from the database 200 relative to the first transaction processing entity.

Figure 2:
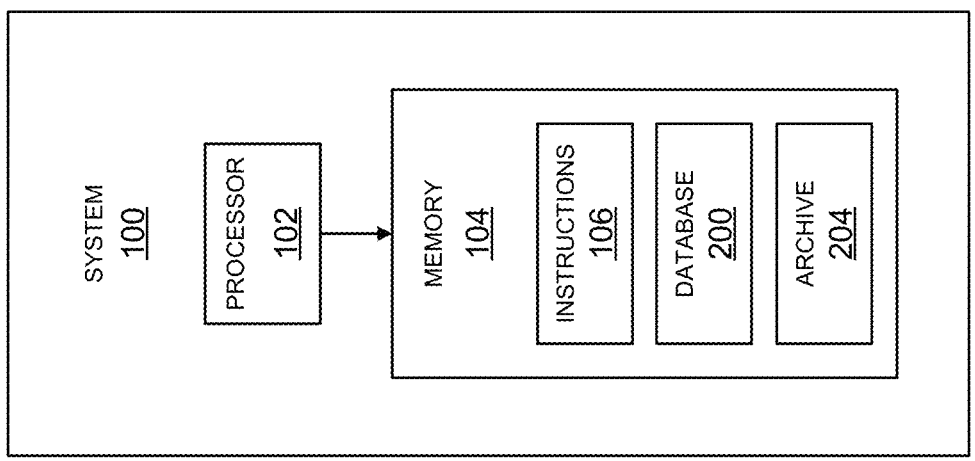
FIG. 2 is a block diagram of a system for automatically migrating user identification tokens in bulk from one transaction processing entity to another, according to an example of the present disclosure.

FIG. 2 is a block diagram depicting various components of one example of a system according to the present disclosure, such as the system 100 described above with respect to the schematic diagram of FIG. 1. As depicted, the system 100 may include a processor 102 that is communicatively coupled to a memory 104. The processor 102 may also be communicatively coupled to a database, such as the database 200, as generally represented in FIG. 1. A database to which the processor 102 is communicatively coupled may be located remotely from the processor 102 and in communication with the processor over a network, such as but not limited to, the network 202 of FIG. 1.

The processor 102 can include one processing device or multiple processing devices. Non-limiting examples of the processor 102 include a Field-Programmable Gate Array (FPGA), an application-specific integrated circuit (ASIC), a microprocessor, etc. The processor 102 can execute instructions 106 stored in the memory 104 to perform operations. In some examples, the instructions 106 can include processor-specific instructions generated by a compiler or an interpreter from code written in a suitable computer-programming language, such as C, C++, C#, etc.

The memory 104 can include one memory or multiple memories. The memory 104 can be non-volatile and may include any type of memory that retains stored information when powered off. Non-limiting examples of the memory 104 include electrically erasable and programmable read-only memory (EEPROM), flash memory, or any other type of non-volatile memory. At least some of the memory 104 can be a non-transitory computer-readable medium from which the processor 102 can read the instructions 106. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 102 can read the instructions 106.

Figure 3:
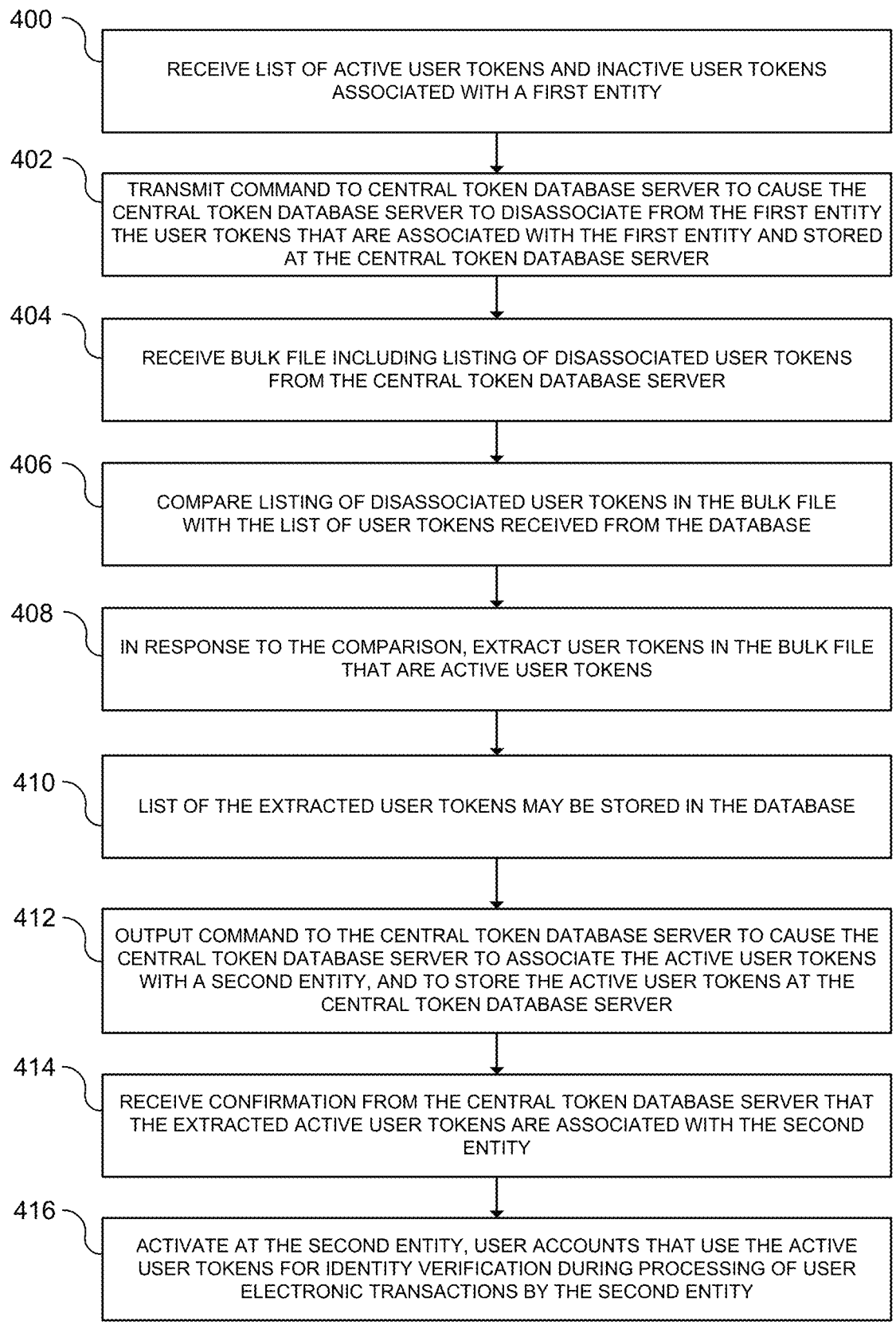
FIG. 3 is a flowchart of a computerized method of automatically migrating user identification tokens in bulk from one transaction processing entity to another using reduced memory resources, according to one example of the present disclosure.

FIG. 3 is a flowchart illustrating one example of a computer-implemented method of migrating user tokens from one transaction processing entity to another, and activation of associated user accounts upon successful token migration. As represented in FIG. 3 at block 400, a list including active user tokens and inactive user tokens associated with a first entity may be received at a processor from a database. At block 402, the processor may output a command to a central token database server to cause the central token database server to disassociate from the first entity, the user tokens that are associated with the first entity and stored at the central token database server. At block 404, the processor may then receive from the central token database server, a bulk file containing a listing of disassociated user tokens, where the disassociated user tokens comprise user tokens disassociated from the first entity by the central token database server in response to the command from the processor.

At block 406, the processor may compare the listing of disassociated user tokens with the list of user tokens received from the database. In response to comparing the listing of disassociated user tokens identified in the bulk file with the list of user tokens, the processor may extract the user tokens in the bulk file that are active user tokens, as represented at block 408. A list of the active user tokens may also be subsequently stored in the database at block 410.

At block 412, the processor may output a command to the central token database server to cause the central token database server to associate the active user tokens with a second entity and to store the extracted active user tokens at the central token database server. At block 414, the processor may receive confirmation from the central token database server that the extracted active user tokens are associated with the second entity. As indicated at block 416, the processor may then activate at the second entity, user accounts that use the extracted active user tokens for identity verification during processing of user electronic transactions by the second entity.

While not shown in FIG. 3, the inactive user tokens appearing on the list of user tokens received from the database may also be extracted to a list and stored in an archive, such as an archival database. Although also not indicated in FIG. 3, a notification may be generated after all user tokens previously associated with the first entity have been disassociated from first entity by the central token database server, and the notification may be transmitted to the first entity at least for informational purposes. For example, the notification may inform the first entity that it can no longer process transactions that rely on the disassociated user tokens for verification or validation.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
   a security token migration computing system communicatively couplable to a database storing digital identity verification security token data associated with at least a first electronic transaction system of a first entity, a second electronic transaction system of a second entity, and a central token database server of a central repository of security tokens, the security token migration computing system including a processor and a memory communicatively coupled to the processor, the memory including instructions that are executable by the processor to cause the security token migration computing system to:
      receive, from the database, a list of digital identity verification security tokens that belong to the first entity and correspond to different users of the first electronic transaction system, and are usable to verify the identity of the users to the first electronic transaction system during electronic transactions with the first entity, the list of digital identity verification security tokens including digital identity verification security tokens characterized as being active and corresponding to current users having open accounts with the first electronic transaction system and digital identity verification security tokens characterized as being inactive and corresponding to past users having closed accounts with the first electronic transaction system;
      output a first command to reconfigure the central token database server by causing a processor thereof to:
         modify at least one database of the central token database server by disassociating, in a single operation, from the first entity and from further use by the first electronic transaction system, the digital identity verification security tokens of the first entity that are stored in the at least one database, and
         generate a bulk file containing a listing of the digital identity verification security tokens disassociated from the first entity by the central token database server in response to the first command;
      retrieve the bulk file from the central token database server;
      compare the listing of the disassociated digital identity verification security tokens in the bulk file with the list of the digital identity verification security tokens received from the database;
      in response to the comparing, extract from the digital identity verification security tokens present in the bulk file, those digital identity verification security tokens that are identified as active digital identity security tokens in the list of digital identity verification security tokens received from the database;
      output a second command to further reconfigure the central token database server by causing the processor of the central token database server to modify at least one database thereof by linking the digital identity verification security tokens extracted from the bulk file and the users that correspond to the extracted digital identity verification security tokens with the second electronic transaction system of the second entity and to store at the central token database server the digital identity verification security tokens extracted from the bulk file as migrated digital identity verification security tokens belonging to the second entity; and
      output a third command to configure the second electronic transaction system of the second entity to activate a user account for each user linked to the migrated digital identity verification security tokens and to subsequently enable identity verification of the users by the second electronic transaction system using the migrated digital identity verification security tokens.

2. The system of claim 1, wherein the electronic transactions are peer-to-peer payment transactions.

3. The system of claim 1, wherein the memory includes instructions that are executable by the processor of the security token migration computing system to further cause the security token migration computing system to store in a database associated with the second electronic transaction system of the second entity, a list of the migrated digital identity verification security tokens.

4. The system of claim 1, wherein the memory includes instructions that are executable by the processor of the security token migration computing system to further cause the security token migration computing system to:
   extract, from the list of digital identity verification security tokens associated with the first entity, a list of the digital identity verification security tokens characterized as being inactive digital identity verification security tokens; and
   store the list of the inactive digital identity verification security tokens in an archive.

5. The system of claim 1, wherein the memory includes instructions that are executable by the processor of the security token migration computing system to further cause the security token migration computing system to:
   subsequent to retrieving the bulk file from the central token database server, generate a notification that the digital identity verification security tokens previously associated with the first entity have been disassociated from first entity by the central token database server; and
   transmit the notification to the first entity.

6. The system of claim 5, wherein the memory includes instructions that are executable by the processor of the security token migration computing system to further cause the security token migration computing system to transmit the notification to the second entity.

7. A non-transitory computer-readable medium comprising instructions that are executable by a processor of a security token migration computing system for causing the security token migration computing system to:
   receive, from a database communicatively coupled to the security token migration computing system and storing digital identity verification security token data associated with at least a first electronic transaction system of a first entity, a list of digital identity verification security tokens that belong to the first entity and correspond to different users of the first electronic transaction system, and are usable to verify the identity of the users to the first electronic transaction system during electronic transactions with the first entity, the list of digital identity verification security tokens including digital identity verification security tokens characterized as being active and corresponding to current users having open accounts with the first electronic transaction system and digital identity verification security tokens characterized as being inactive and corresponding to past users having closed accounts with the first electronic transaction system;
   output a first command to a central token database server of a central repository of security tokens communicatively coupled to the security token migration computing system to reconfigure the central token database server by causing a processor of the central token database server to:
      modify at least one database of the central token database server by disassociating, in a single operation, from the first entity and from further use by the first electronic transaction system, the digital identity verification security tokens of the first entity that are stored in the at least one database, and
      generate a bulk file containing a listing of the digital identity verification security tokens disassociated from the first entity by the central token database server in response to the command from the security token migration computing system;
   retrieve the bulk file from the central token database server;
   compare the listing of the disassociated digital identity verification security tokens in the bulk file with the list of the digital identity verification security tokens received from the database;
   in response to the comparing, extract from the digital identity verification security tokens present in the bulk file, those digital identity verification security tokens that are identified as active digital identity security tokens in the list of digital identity verification security tokens received from the database;
   output a second command to the central token database server to further reconfigure the central token database server by causing the processor of the central token database server to modify at least one database thereof by linking the digital identity verification security tokens extracted from the bulk file and the users that correspond to the extracted digital identity verification security tokens with a second electronic transaction system of a second entity communicatively coupled to the security token migration computing system and to store at the central token database server the extracted digital identity verification security tokens extracted from the bulk file as migrated digital identity verification security tokens belonging to the second entity; and
   output a third command to configure the second electronic transaction system of the second entity to activate a user account for each user linked to the migrated digital identity verification security tokens and to subsequently enable identity verification of the users by the second electronic transaction system using the migrated digital identity verification security tokens.

8. The non-transitory computer-readable medium of claim 7, wherein the electronic transactions are peer-to-peer payment transactions.

9. The non-transitory computer-readable medium of claim 7, wherein the instructions of the non-transitory computer-readable medium are executable for further causing the processor to store in a database associated with the second electronic transaction system of the second entity, a list of the migrated digital identity verification security tokens.

10. The non-transitory computer-readable medium of claim 7, wherein the instructions of the non-transitory computer-readable medium are executable for further causing the processor of the security token migration computing system to:
   extract, from the list of digital identity verification security tokens associated with the first entity, a list of the digital identity verification security tokens characterized as being inactive digital identity verification security tokens; and
   store the list of the inactive digital identity verification security tokens in an archive.

11. The non-transitory computer-readable medium of claim 7, wherein the instructions of the non-transitory computer-readable medium are executable for further causing the processor of the security token migration computing system to:
  subsequent to retrieving the bulk file from the central token database server, generate a notification that the digital identity verification security tokens previously associated with the first entity have been disassociated from first entity by the central token database server; and
  transmit the notification to the first entity.

12. The non-transitory computer-readable medium of claim 11, wherein the instructions of the non-transitory computer-readable medium are executable for further causing the processor of the security token migration computing system to transmit the notification to the second entity.

13. A computer-implemented method comprising:
  receiving at a processor of a security token migration computing system, from a database communicatively coupled to the security token migration computing system and storing digital identity verification security token data associated with at least a first electronic transaction system of a first entity, a list of digital identity verification security tokens that belong to the first entity and correspond to different users of the first electronic transaction system, and are usable to verify the identity of the users to the first electronic transaction system during electronic transactions with the first entity, the list of digital identity verification security tokens including digital identity verification security tokens characterized as being active and corresponding to current users having open accounts with the first electronic transaction system and digital identity verification security tokens characterized as being inactive and corresponding to past users having closed accounts with the first electronic transaction system;
  outputting by the processor of the security token migration computing system, a first command that reconfigures a central token database server of a central repository of security tokens communicatively coupled to the security token migration computing system by causing a processor of the central token database server to:
    modify at least one database of the central token database server by disassociating, in a single operation, from the first entity and from further use by the first electronic transaction system, the digital identity verification security tokens of the first entity that are stored in the at least one database, and
    generate a bulk file containing a listing of the digital identity verification security tokens disassociated from the first entity by the central token database server in response to the command from the security token migration computing system;
  retrieving, by the processor of the security token migration computing system, the bulk file from the central token database server;
  comparing, by the processor of the security token migration computing system, the listing of the disassociated digital identity verification security tokens in the bulk file with the list of the digital identity verification security tokens received from the database;
  in response to the comparing, extracting by the processor of the security token migration computing system from the digital identity verification security tokens present in the bulk file, those digital identity verification security tokens that are identified as active digital identity security tokens in the list of digital identity verification security tokens received from the database;
  outputting, by the processor, a second command to the central token database server that further reconfigures the central token database server by causing the processor of the central token database server to modify at least one database thereof by linking the digital identity verification security tokens extracted from the bulk file and the users that correspond to the extracted digital identity verification security tokens with a second electronic transaction system of a second entity communicatively coupled to the security token migration computing system and to store at the central token database server the extracted digital identity verification security tokens extracted from the bulk file as migrated digital identity verification security tokens belonging to the second entity; and
  outputting, by the processor of the security token migration computing system, a third command that configures the second electronic transaction system of the second entity to activate a user account for each user linked to the migrated digital identity verification security tokens and to subsequently enable identity verification of the users by the second electronic transaction system using the migrated digital identity verification security tokens.

14. The computer-implemented method of claim 13, wherein the electronic transactions are peer-to-peer payment transactions.

15. The computer-implemented method of claim 13, further comprising storing, by the security token migration computing system, a list of the migrated digital identity verification security tokens in a database associated with the second electronic transaction system of the second entity.

16. The computer-implemented method of claim 13, further comprising:
  extracting, by the security token migration computing system, from the list of digital identity verification security tokens associated with the first entity, a list of the digital identity verification security tokens identified as being inactive digital identity verification security tokens; and
  storing the list of the inactive digital identity verification security tokens in an archive.

17. The computer-implemented method of claim 13, further comprising:
  subsequent to retrieving the bulk file from the central token database server, generating, by the security token migration computing system, a notification that the digital identity verification security tokens previously associated with the first entity have been disassociated from first entity by the central token database server; and
  transmitting the notification to the first entity.

18. The computer-implemented method of claim 17, wherein the notification is also transmitted to the second entity.

* * * * *